United States Patent
Nakamura et al.

(10) Patent No.: US 9,529,707 B2
(45) Date of Patent: Dec. 27, 2016

(54) APPARATUS AND METHOD FOR REDUCING READ-MODIFY-WRITE CYCLES BY COMBINING UNALIGNED WRITE COMMANDS

(71) Applicant: FUJITSU LIMITED, Kawasaki-shi, Kanagawa (JP)

(72) Inventors: Masatoshi Nakamura, Machida (JP); Koutarou Nimura, Kawasaki (JP); Marie Abe, Kawasaki (JP); Yoshihito Konta, Kawasaki (JP); Hidefumi Kobayashi, Yokohama (JP); Mihoko Tojo, Kawasaki (JP); Yasuhiro Ogasawara, Fujisawa (JP); Shigeru Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 14/510,157

(22) Filed: Oct. 9, 2014

(65) Prior Publication Data
US 2015/0121021 A1 Apr. 30, 2015

(30) Foreign Application Priority Data
Oct. 24, 2013 (JP) .................................. 2013-220787

(51) Int. Cl.
G06F 12/02 (2006.01)
G06F 3/06 (2006.01)

(52) U.S. Cl.
CPC .......... *G06F 12/023* (2013.01); *G06F 3/0611* (2013.01); *G06F 3/0659* (2013.01); *G06F 3/0661* (2013.01);
(Continued)

(58) Field of Classification Search
None
See application file for complete search history.

(56) References Cited

U.S. PATENT DOCUMENTS 6,343,343 B1 * 1/2002 Menon .................. G06F 3/0608
711/113
2004/0088479 A1 5/2004 Hall
(Continued)

FOREIGN PATENT DOCUMENTS

JP 2005-063441 3/2005
JP 2010-026345 2/2010
(Continued)

OTHER PUBLICATIONS

Extended European Search Report dated Feb. 25, 2015 for corresponding European Patent Application No. 14188972.5, 9 pagers.

*Primary Examiner* — Kevin Verbrugge
(74) *Attorney, Agent, or Firm* — Fujitsu Patent Center

(57) ABSTRACT

Write commands for a storage device specify write data with either a first data step size or a second data step size. In the former case, the storage device performs a read-modify-write (RMW) cycle which includes reading data with the second data step size. In the latter case, the storage device executes the command in a single write cycle. A command sorting unit sorts received commands into two groups, first commands and second commands, when storing them in a memory. First commands are write commands whose data boundaries do not match with the second data step size. Second commands include write commands whose data boundaries match with the second data step size. A command issuing unit converts first commands into a second command upon predetermined conditions. The command issuing unit issues the second commands to the storage device, in preference to the first commands.

11 Claims, 14 Drawing Sheets

(52) U.S. Cl.
CPC ......... *G06F 3/0689* (2013.01); *G06F 2212/69* (2013.01)

(56) References Cited

U.S. PATENT DOCUMENTS

| | | |
|---|---|---|
| 2005/0036381 A1 | 2/2005 | Hassner et al. |
| 2008/0120463 A1* | 5/2008 | Ashmore .............. G06F 3/0613 711/114 |
| 2009/0024808 A1 | 1/2009 | Hillier, III et al. |
| 2010/0079904 A1 | 4/2010 | Sato |
| 2010/0232048 A1 | 9/2010 | Aida |
| 2011/0191537 A1* | 8/2011 | Kawaguchi ........... G06F 3/0605 711/114 |
| 2012/0137063 A1* | 5/2012 | Horibe ................ G06F 12/0866 711/113 |
| 2013/0007381 A1* | 1/2013 | Palmer ................ G06F 12/0246 711/154 |
| 2014/0289493 A1* | 9/2014 | Kobayashi .......... G06F 12/0868 711/171 |
| 2016/0011966 A1* | 1/2016 | Keeler ................ G06F 12/0246 711/103 |

FOREIGN PATENT DOCUMENTS

| | | |
|---|---|---|
| JP | 2010-080021 | 4/2010 |
| JP | 2010-211888 | 9/2010 |
| JP | 2012-113789 | 6/2012 |
| JP | 2012-221350 | 11/2012 |

\* cited by examiner

APPARATUS AND METHOD FOR REDUCING READ-MODIFY-WRITE CYCLES BY COMBINING UNALIGNED WRITE COMMANDS

CROSS-REFERENCE TO RELATED APPLICATION

This application is based upon and claims the benefit of priority of the prior Japanese Patent Application No. 2013-220787, filed on Oct. 24, 2013, the entire contents of which are incorporated herein by reference.

FIELD

The embodiments discussed herein relate to an apparatus and method for controlling storage devices.

BACKGROUND

With the recent advancements in hard disk drive (HDD) design toward high-density recording, the physical sector format of HDDs has been migrating from 512 bytes per sector to 4096 (4K) bytes per sector. Many of the existing software components, on the other hand, assume that the HDDs are configured with 512-byte logical sectors, and here arises an issue of compatibility between their assumption and the native 4K-byte sectors of HDDs. Those 4K-native HDDs are supposed to operate only with 4096-byte logical sector mapping, but the 512-byte logical sectors are not directly mapped onto their 4096-byte physical sectors. A known solution for this problem is the 512e mode of the Advanced Format Technology (AFT). In this 512e mode, 4K-native HDDs emulate operation in the conventional 512-byte sector organization, thus enabling the existing software components to access data in those HDDs. See, for example, the following publications:

Japanese Laid-open Patent Publication No. 2012-221350
Japanese Laid-open Patent Publication No. 2005-63441
Japanese Laid-open Patent Publication No. 2010-26345
Japanese Laid-open Patent Publication No. 2010-211888
Japanese Laid-open Patent Publication No. 2010-80021

One thing to note about the AFT 512e mode, however, is that HDDs execute a read-modify-write (RMW) cycle in response to a write command, when its write data boundaries are not aligned with the 4096-byte physical sector boundaries. RMW cycles include a read operation before writing data, which means that the write operation is delayed by a multiple of the rotation time of disk media (e.g., two rotations). This delay degrades the performance of HDD access.

SUMMARY

According to an aspect of the embodiments to be discussed herein, there is provided a storage control apparatus that controls input and output operations on a storage device in response to received commands, where the received commands specifying data with a first data step size, and the storage device being configured to store data with a second data step size that is a multiple of the first data step size. This storage control apparatus includes a memory configured to store commands, and a controller configured to perform a procedure including: storing the received commands in the memory, while sorting the received commands into first commands and second commands, the first commands being write commands whose data boundaries do not match with the second data step size, the second commands including write commands whose data boundaries match with the second data step size, converting one or more first commands in the memory into a second command when a predetermined condition is met, and issuing the second commands to the storage device, in preference to the first commands.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings.

(a) First Embodiment

Figure 1:
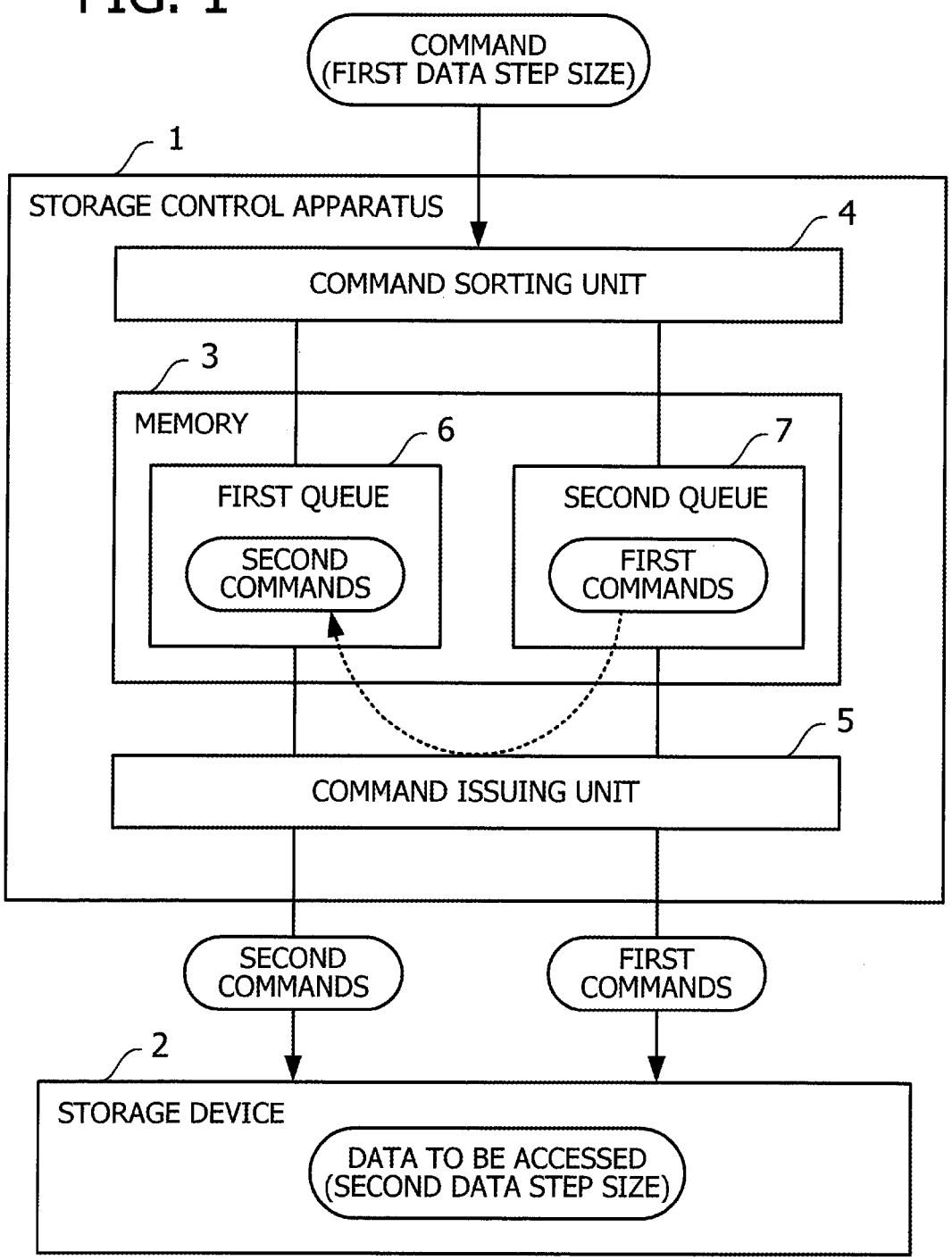
FIG. 1 illustrates an exemplary configuration of a storage control apparatus according to a first embodiment.

This section describes a first embodiment with reference to an exemplary configuration of a storage control apparatus illustrated in FIG. 1. The illustrated storage control apparatus 1 controls input and output operations on a storage device 2 in response to commands from host controllers (not illustrated) such as file servers. For example, the storage control apparatus 1 receives a command that requests access to data whose size is specified with a first data step size.

More specifically, the term "first data step size" refers to the size of each logical sector of HDDs, which matches with the conventional physical sector size, 512 bytes or 520 bytes. In contrast to the first data step size, another term "second data step size" refers to an integer multiple of the first data step size. The second data step size may be, for example, eight times as large as the first data step size. This second data step size corresponds to the physical sector size of 4K-native HDDs, which is 4096 (=512×8) bytes or 4160 bytes (=520×8) bytes.

The storage device 2 has its native format based on the second data step size, with compatibility with the first data step size. In the context of FIG. 1, the storage device 2 is configured to handle input and output of data in response to commands with the first data step sizes, while physically storing data in a multiple of the first data step size. For example, the storage device 2 is compatible with the AFT standard, supporting the 512e emulation mode to enable access to 4K physical sectors by using read and write commands specifying 512-byte logical sectors. The storage device 2 performs a read-modify-write (RMW) cycle for a write command with the first data step size, as opposed to a single write cycle in the case of a write command with the second data step size. RMW cycles include reading data with the second data step size.

The storage control apparatus 1 includes, among others, a memory 3, a command sorting unit 4, and a command issuing unit 5. The memory 3 is, for example, a cache memory configured to store commands received from host controllers.

The command sorting unit 4 stores received commands in the memory 3 while sorting them into two groups referred to herein as "first commands" and "second commands." The first commands are write commands whose data boundaries do not match with the second data step size. The second commands include write commands whose data boundaries match with the second data step size. In other words, the first commands cause the storage device 2 to perform an RMW cycle, whereas the second commands do not. The second commands further include read commands, in addition to the write commands noted above.

For example, the memory 3 includes a first queue 6 and a second queue 7, to which the command sorting unit 4 distributes received commands. That is, the command sorting unit 4 selectively enters first commands to the second queue 7 and second commands to the first queue 6.

The command issuing unit 5 issues second commands to the storage device 2 in preference to first commands. The command issuing unit 5 also converts some first commands to second commands when those first commands satisfy a predetermined condition. As a result of the preference for the second commands, the first commands stay longer in the memory 3, and during their stay in the memory 3, some of the first commands may have the chance of turning into second commands. The proposed storage control apparatus 1 controls I/O transactions on the storage device 2 in this way, while reducing the number of pending commands that need RMW cycles. In other words, the storage control apparatus 1 reduces the chances of RMW operations, thereby preventing the storage device 2 from degradation of its access performance.

(b) Second Embodiment

Figure 2:
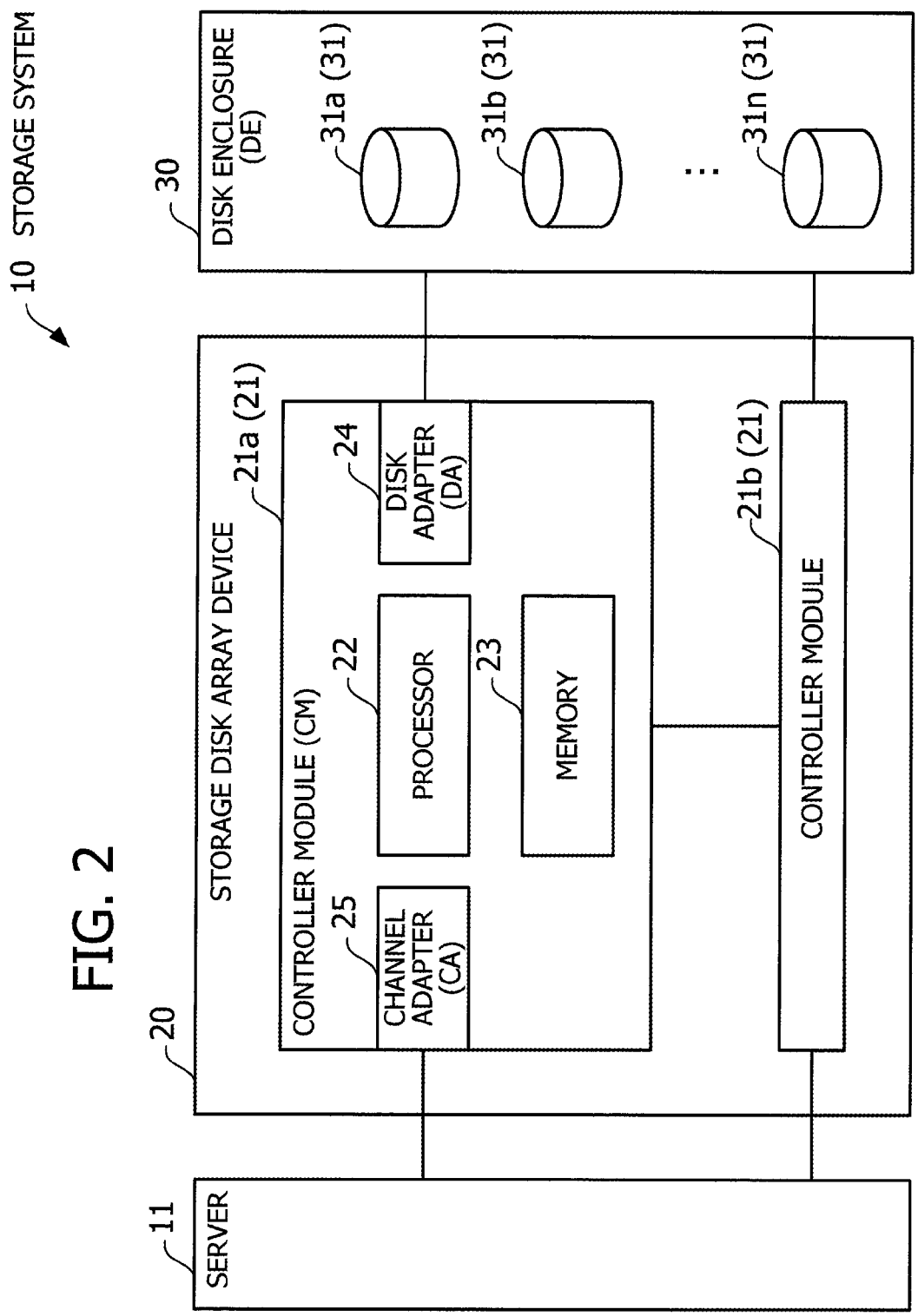
FIG. 2 illustrates an exemplary configuration of a storage system according to a second embodiment, together with an exemplary hardware configuration of a storage disk array device.

This section describes a storage system of a second embodiment, beginning with a hardware configuration of a storage disk array device in FIG. 2. FIG. 2 illustrates an exemplary configuration of a storage system according to the second embodiment, together with an exemplary hardware configuration of a storage disk array device.

The illustrated storage system 10 includes a storage disk array device 20 and a disk enclosure (DE) 30. Further, a server 11 is coupled to the storage disk array device 20 via communication links. While FIG. 2 illustrates only one server 11, the storage system 10 may actually include a plurality of such servers. The storage disk array device 20 has a link to the DE 30, which contains a plurality of HDDs 31a, 31b, . . . , 31n (collectively referred to as HDDs 31). These HDDs 31 are one type of storage devices, with 4K-byte physical sectors and support emulation of 512-byte sectors.

The DE 30 includes an interface (not illustrated) to connect HDDs 31 with the storage disk array device 20. The storage system 10 provides logical volumes created in individual HDDs or in a combination of two or more HDDs 31. While FIG. 2 illustrates the DE 30 as a stand-alone device coupled to the storage disk array device 20 via communication links, the DE 30 may be implemented as integral part of the storage disk array device 20. Further, the storage disk array device 20 may be connected to more DEs than seen in FIG. 2.

The illustrated storage disk array device 20 receives I/O requests for HDDs 31 from the server 11. These I/O requests specify particular logical volumes as part of the HDDs 31. To handle such I/O requests, the storage disk array device 20 has one or more controller modules (CM) 21. In the example of FIG. 2, two CMs 21a and 21b are included to provide redundancy protection in the storage disk array device 20.

The CM 21a, as one implementation of the foregoing storage control apparatus 1, controls HDDs 31 in response to I/O requests (e.g., write commands and read commands) received from the server 11. The CM 21a includes a processor 22, a memory 23, a disk adapter (DA) 24, and a channel adapter (CA) 25, interconnected by a bus (not illustrated). The CM 21a reaches HDDs 31 via the DA 24 and the server 11 via the CA 25. The DA 24 controls the interface and access to the HDDs 31.

The processor 22 controls the CM 21a as a whole, besides controlling I/O to the HDDs 31. The processor 22 may be a single processing device or a multiprocessor system including two or more processing devices. For example, the processor 22 may be, but not limited to, a central processing unit (CPU), micro processing unit (MPU), digital signal processor (DSP), application specific integrated circuit (ASIC), programmable logic device (PLD), or any combinations of them.

The memory 23 may include, for example, a random access memory (RAM) and non-volatile memory. Besides holding data read out of the HDDs 31, the memory serves as an I/O wait queue for temporarily storing I/O requests, and as a buffer for storing write data for the HDDs 31. The memory 23 also stores user data and control data. For example, the RAM serves as the primary storage in the CM 21a, which is used to temporarily store at least some of the operating system (OS) programs, firmware programs, and application programs that the processor 22 executes, in addition to other various data objects that it manipulates at runtime. The RAM may include cache memory, in addition to the memory devices used to store various data mentioned above.

As another part of the memory 23, the non-volatile memory retains its data content even when the storage disk array device 20 is not powered. Examples of non-volatile memory include semiconductor memory devices such as electrically erasable programmable read-only memory (EE- PROM) and flash memory, as well as magnetic storage devices such as HDDs. The non-volatile memory stores program and data files of the operating system, firmware, and applications.

The other CM 21*b* is configured similarly to the CM 21*a* discussed above. See the same description for details of the CM 21*b*.

The above-described hardware serves as a platform for implementing processing functions of the proposed CMs 21 (and storage disk array device 20 as a whole) of the second embodiment. The noted hardware configuration may also be used to implement the storage control apparatus 1 discussed in the first embodiment.

The CMs 21 (storage disk array device 20) provide their processing functions of the second embodiment by, for example, executing programs encoded and stored in a computer-readable medium. A variety of storage media may be used for this purpose, which include non-volatile memory. The processor 22 reads out at least part of the programs stored in the non-volatile memory, loads them into RAM, and executes the loaded programs. The programs for the CMs 21 may be stored in portable storage media such as optical discs, memory devices, and memory cards (not illustrated). Optical discs include digital versatile disc (DVD), DVD-RAM, compact disc read-only memory (CD-ROM), CD-Recordable (CD-R), or CD-Rewritable (CD-RW), for example. Memory devices are data storage media having a capability to communicate with an I/O interface or peripheral device interface (not illustrated). Memory cards are one type of memory devices, in the physical form of a small card. For example, a memory card reader/writer (not illustrated) is used to write data to or read data from a memory card.

The programs stored in a portable storage medium are previously installed in the non-volatile memory under the control of the processor 22, so that they are ready to execute upon request. It may also be possible for the processor 22 to execute program codes read out of a portable storage medium, without installing them in its local non-volatile memory.

Figure 3:
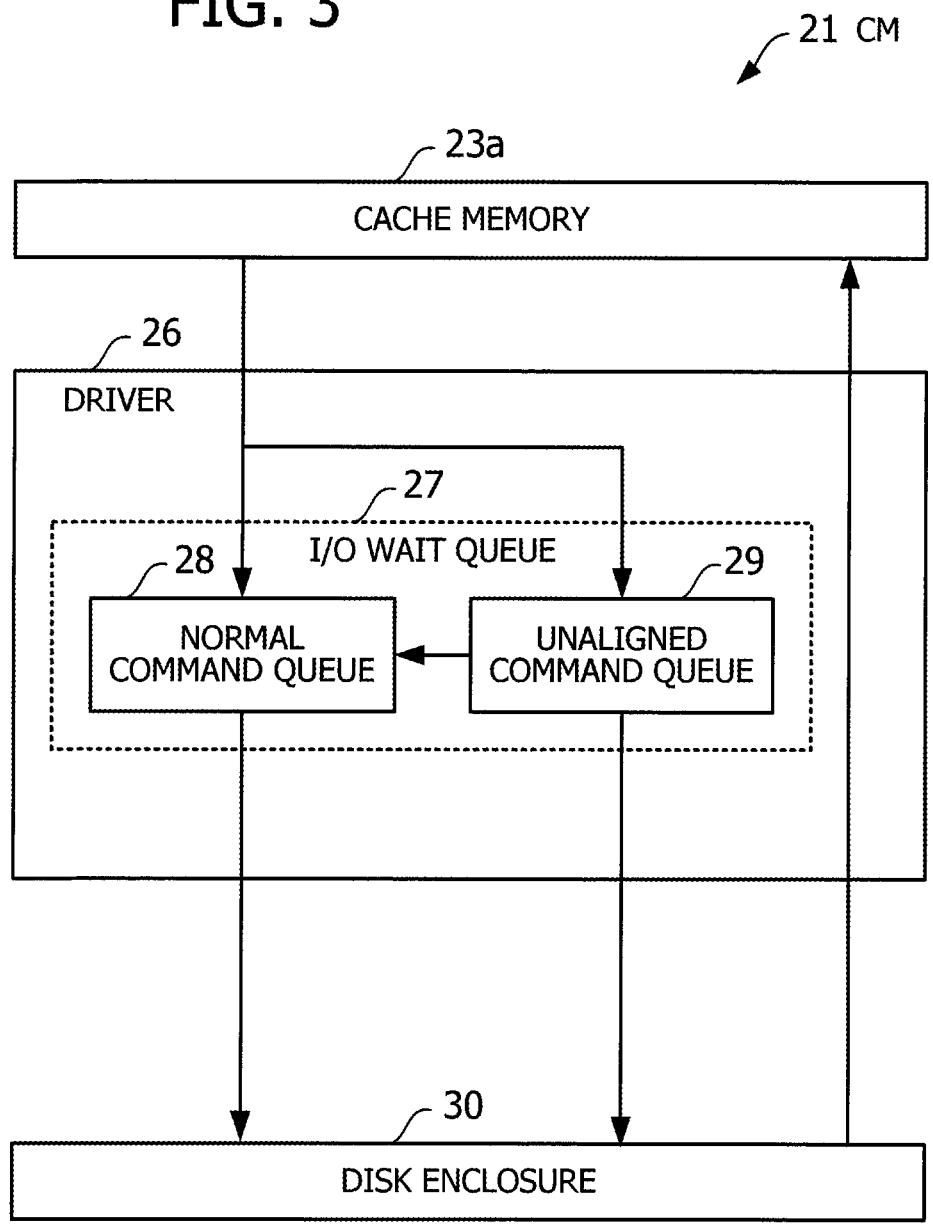
FIG. 3 exemplifies an I/O wait queue according to the second embodiment.

The second embodiment offers an I/O wait queue as will be described below with reference to FIG. 3. FIG. 3 exemplifies an I/O wait queue according to the second embodiment. The illustrated CM 21 has a driver 26 as a control module for issuing commands to HDDs 31 and handling responses from the same, where the commands may be those defined in, for example, the Small Computer System Interface (SCSI) standards. The driver 26 is actually a collection of programs executed by the processor 22. Specifically, the driver 26 creates an I/O wait queue 27 on the memory 23 in preparation for command control. The driver 26 receives commands from host devices through a cache memory 23*a* and enqueues them to the I/O wait queue 27. When it is ready to issue a command to HDDs 31, the driver 26 dequeues a command from the I/O wait queue 27 and issues it to the DE 30 (HDDs 31). When there is a response from the DE 30 (HDDs 31), the driver 26 responds to the requesting host device through the cache memory 23*a*.

The I/O wait queue 27 actually includes a normal command queue 28 and an unaligned command queue 29. The normal command queue 28 may also be called an "aligned command queue," in contrast to the unaligned command queue 29. Received commands are a mixture of aligned commands and unaligned commands described below. The driver 26 directs unaligned commands to the unaligned command queue 29 and the rest of the received commands (or aligned commands) to the normal command queue 28.

Unaligned commands, previously discussed as the first commands in the first embodiment, are write commands whose data boundaries do not match with the physical sector size of HDDs 31 and whose execution consequently needs an RMW cycle on the HDDs 31. Aligned commands, previously discussed as the second commands in the first embodiment, include write commands whose data boundaries match with the physical sector size of HDDs 31 and whose execution includes no RMW cycles on the HDDs 31. Aligned commands also include read commands, which are not affected by whether their data boundaries match with the physical sector size of HDDs 31.

Figure 4:
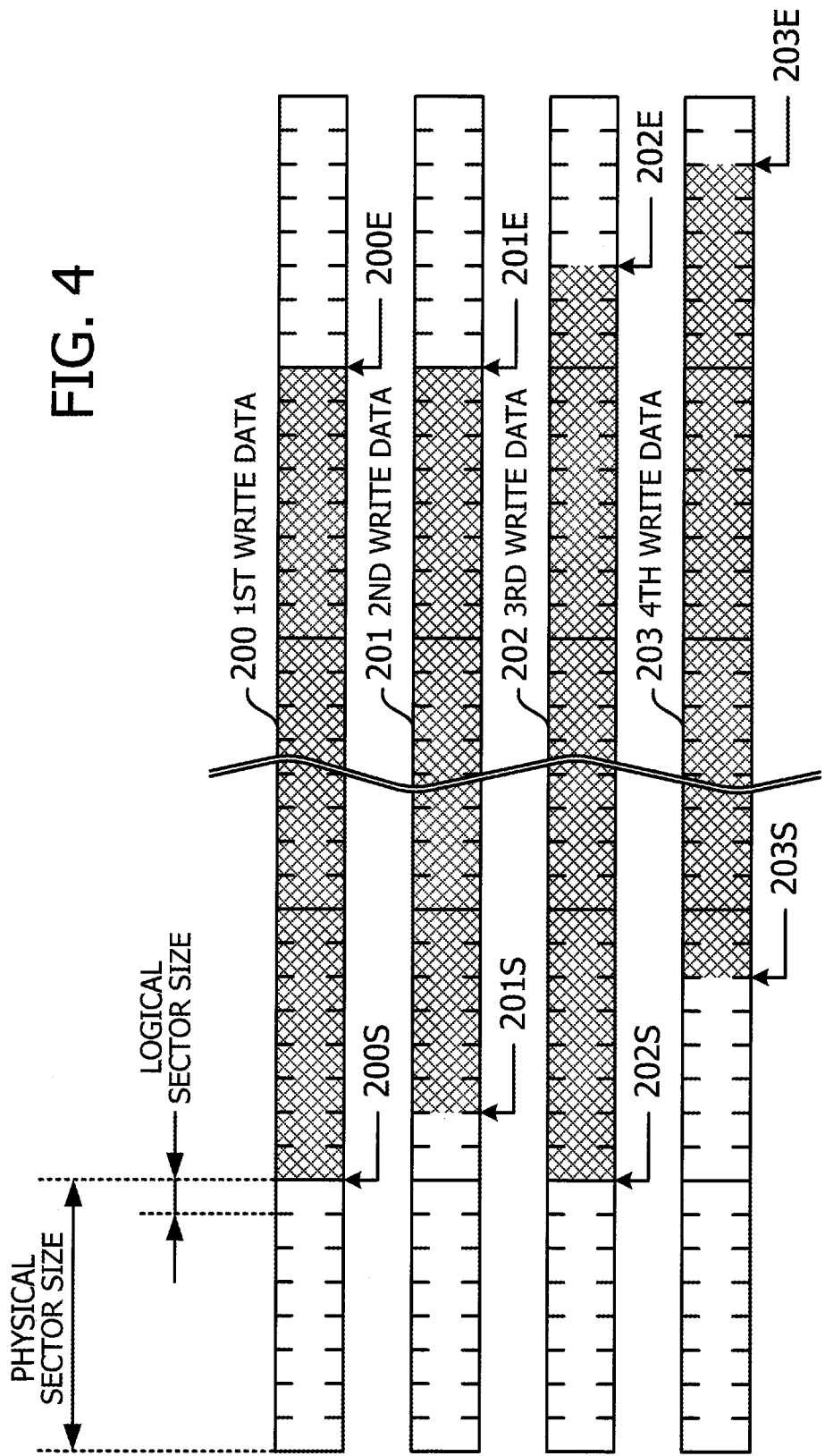
FIG. 4 illustrates several examples of boundary alignment and misalignment of write data to which the second embodiment is directed.

Referring now to FIG. 4, the following description will explain how the physical sector size of HDDs 31 relates to data boundaries of commands. FIG. 4 illustrates several examples of boundary alignment and misalignment of write data to which the second embodiment is directed.

The storage space of HDDs 31 is divided into logical sectors with a size of 520 bytes, while their physical sectors are 4160 bytes (4K bytes), eight times as large as the logical sector size. The HDDs 31 perform RMW as part of their internal operations when the data size specified in a received write command is less than 4K bytes. Since RMW cycles take more time than simple write operations, such small-data write commands may slow down the performance of HDDs 31.

In the example of FIG. 4, first write data 200 matches with the physical sector boundaries at both of its head point 200S and end point 200E, thus causing no RMW cycles in HDDs 31. Second write data 201 matches with the physical sector boundaries at its end point 201E, but not at its head point 201S, and thus causes HDDs 31 to do RMW in the physical sector where the second write data 201 begins. Third write data 202, on the other hand, matches with the physical sector boundaries at its head point 202S, but not at its end point 202E, and thus causes HDDs 31 to do RMW in the physical sector where the third write data 202 ends. Fourth write data 203 does not match with the physical sector boundaries at either its head point 203S or its end point 203E, and thus causes HDDs 31 to do RMW in two physical sectors corresponding to these points 203S and 203E.

The first write data 200 can thus be written by using aligned commands in all physical sectors. In contrast, write commands for the other pieces of write data 201, 202, and 203 discussed above include unaligned commands in their topmost physical sector or endmost physical sector or both.

Figure 5:
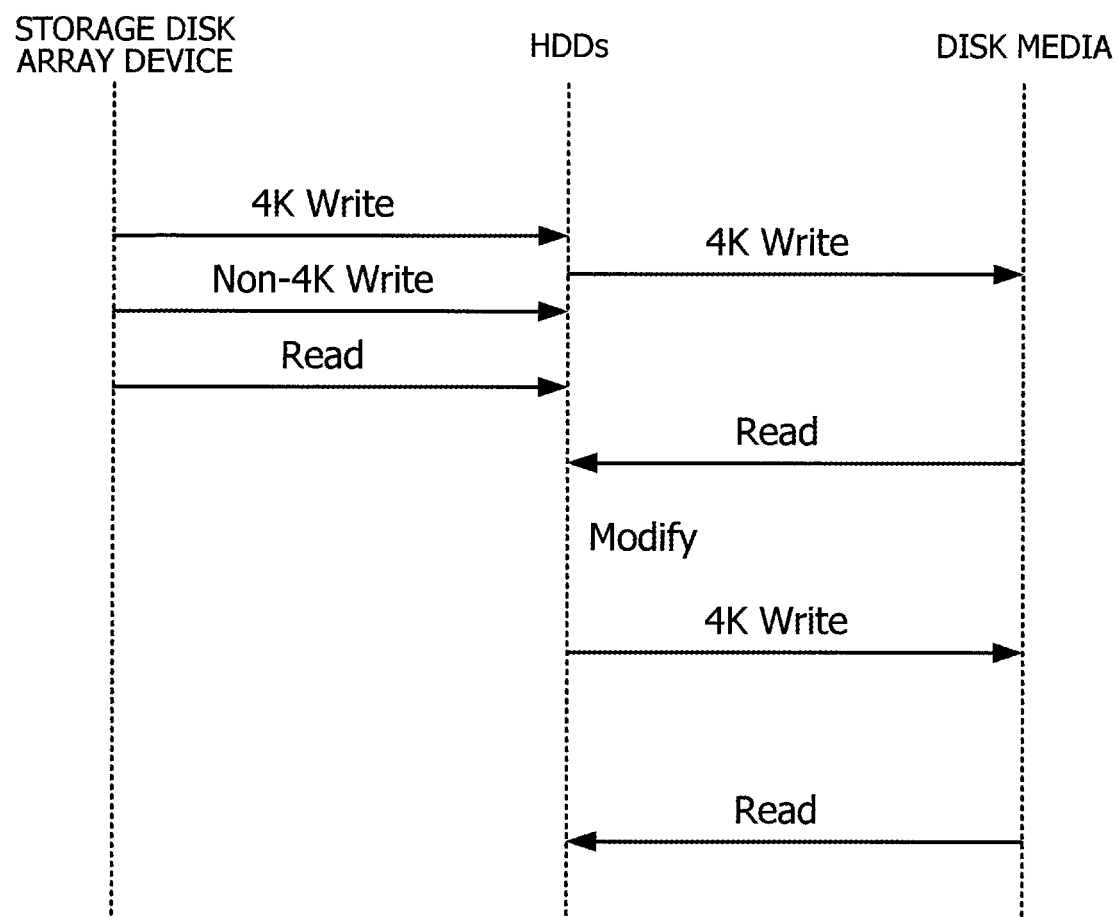
FIG. 5 illustrates an example of a delay of a read command in the second embodiment which is caused by a preceding unaligned command.

Referring next to FIG. 5, the following description will discuss possible delays of HDD access caused by unaligned commands. FIG. 5 illustrates an example of a delay of a read command in the second embodiment which is caused by a preceding unaligned command. Specifically, FIG. 5 illustrates a series of commands sent from the storage disk array device 20 to HDDs 31, which include a write command for 4K-byte data (referred to as a 4K write command), a write command for data of less than 4K bytes (referred to as a non-4K write command), and a read command issued in that order.

In response to the first 4K write command, the HDDs 31 write the specified 4K-byte data in their disk media. For the second non-4K write command, the HDDs 31 first read out 4K-byte data currently stored in the physical sector where the specified write data is to go. The HDDs 31 then modify this read data with the write data and write the modified 4-byte data back to its original location in the disk media. That is, this write command, issued from the storage disk array device 20 for data smaller than 4K bytes, causes the HDDs 31 to perform an RMW cycle. The additional time of read operation in an RMW cycle may amount to about the time equivalent of two disk rotations, which spoils the performance of disk access.

The noted additional time in RMW results in a delay of the subsequent read command to start. Such delay times would accumulate to a non-negligible level as non-4K write commands are submitted more frequently. In other words, reduction of those non-4K write commands will help the storage system avoid possible performance degradation in the disk access.

Figure 6:
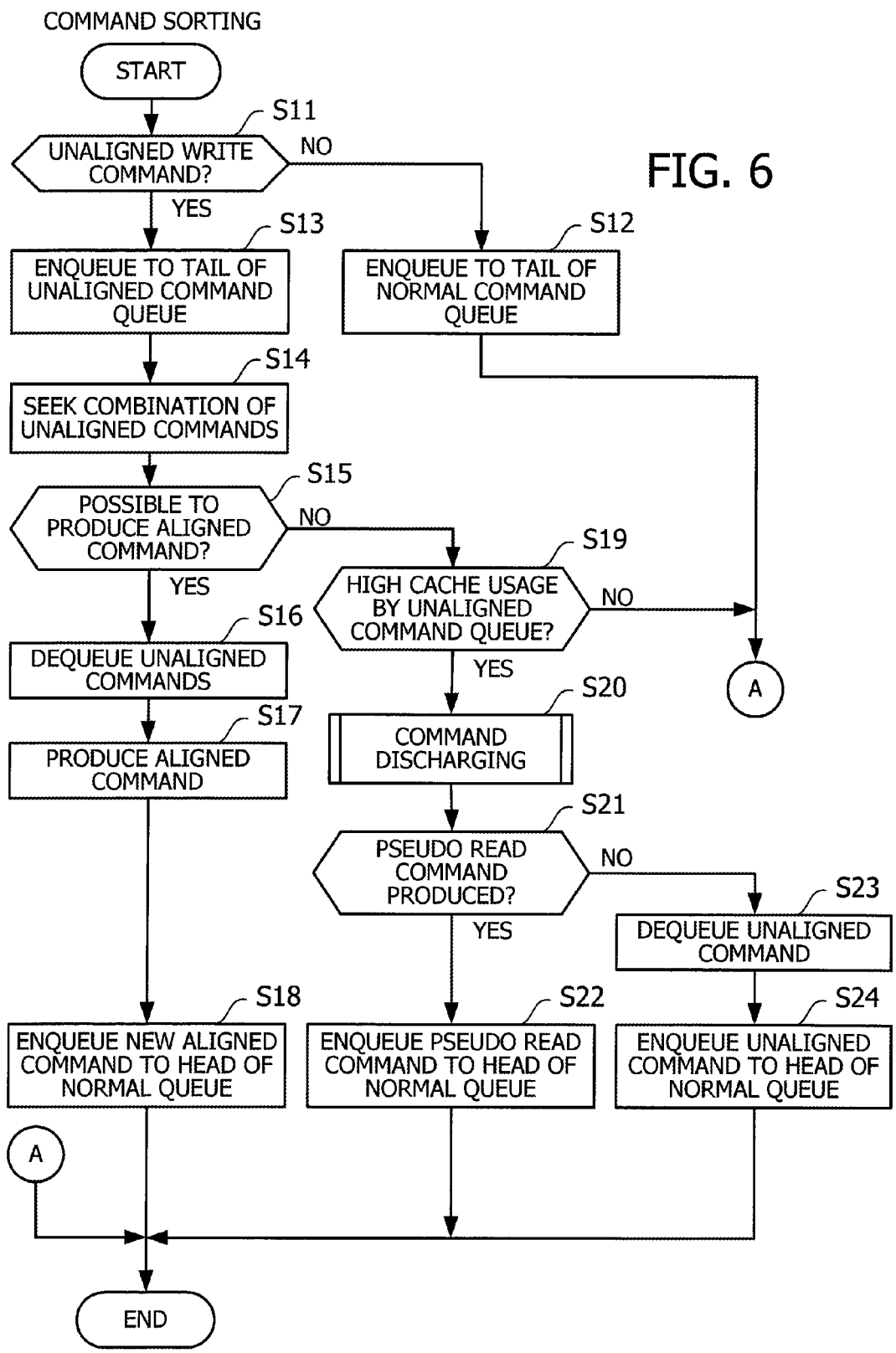
FIG. 6 is a flowchart of a command sorting routine according to the second embodiment.

Referring now to FIG. 6, the following description will explain how the second embodiment distributes commands to two queues. FIG. 6 is a flowchart of a command sorting routine according to the second embodiment.

The storage disk array device 20 subjects received commands to a command sorting routine to enqueue them to either the foregoing normal command queue 28 or unaligned command queue 29. The command sorting routine also converts some unaligned commands in the unaligned command queue 29 to an aligned command when they satisfy a predetermined condition(s). The processor 22 executes this command sorting routine as part of the foregoing driver 26 in response to a command received from a host device.

(Step S11) Upon receipt of a new command, the driver 26 (or processor 22) determines whether the received command is an unaligned write command. In other words, this determination tests whether the received command is to cause an RMW cycle. When the command is found to be an unaligned write command, the driver 26 advances to step S13. Otherwise, the driver 26 proceeds to step S12.

(Step S12) The driver 26 enqueues the received command to the tail of the normal command queue 28 and exits from the command sorting routine. Basically the commands stored in this normal command queue 28 are dequeued on a first-in first-out (FIFO) basis.

(Step S13) The driver 26 enqueues the received commands to the tail of the unaligned command queue 29.

Figure 7:
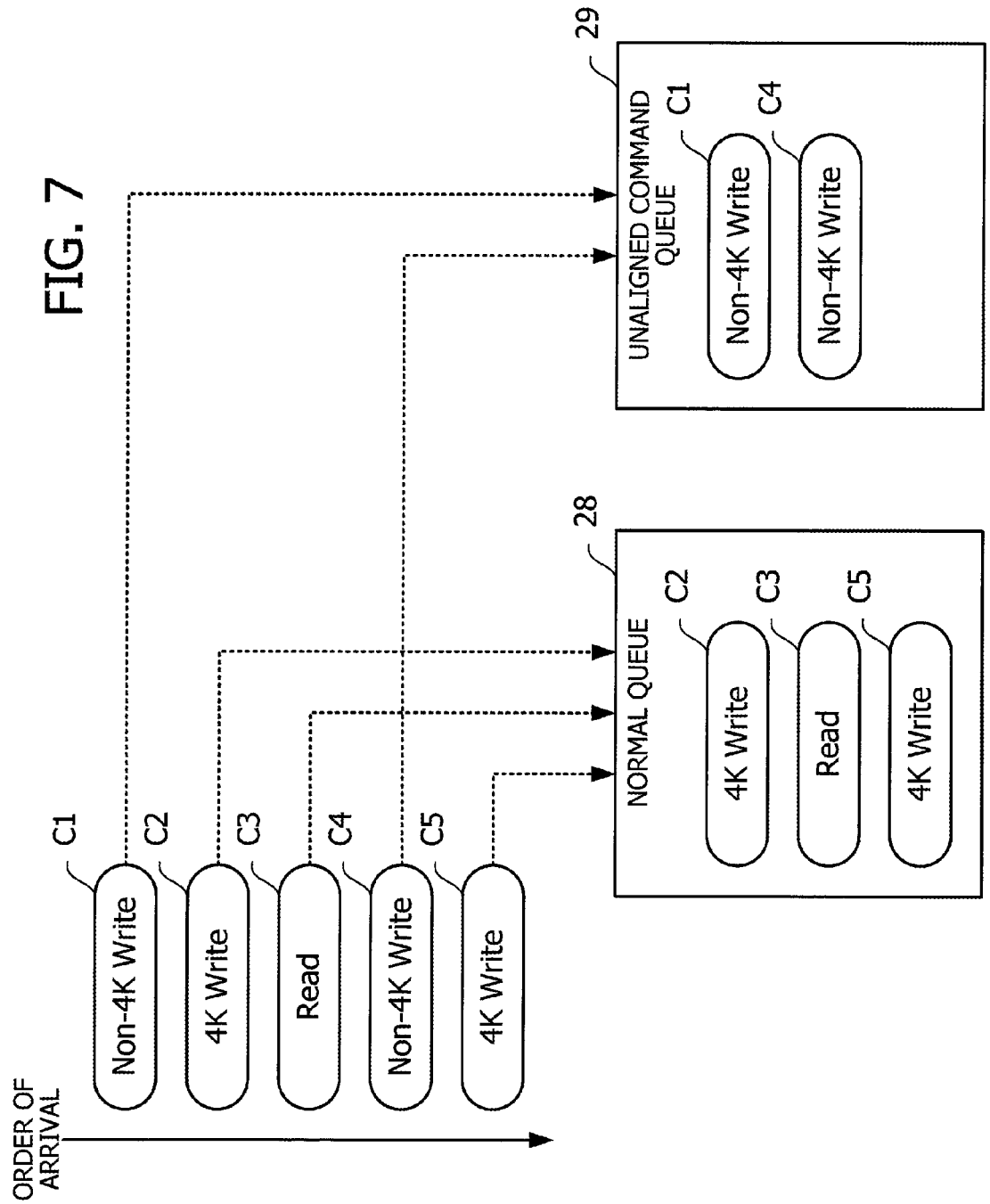
FIG. 7 gives an example of commands enqueued to a normal command queue or an unaligned command queue of the second embodiment.

Before continuing the explanation of the routine, the description presents an example of command sorting with reference to FIG. 7. FIG. 7 gives an example of commands enqueued to the normal command queue or unaligned command queue of the second embodiment. The driver 26 now has five commands C1, C2, C5 that the storage disk array device 20 has received in that order. First, the driver 26 enqueues command C1 to the tail of the unaligned command queue 29 since it is a non-4K write command, which falls in the category of unaligned commands. Then the driver 26 enqueues command C2 to the tail of the normal command queue 28 since it is a 4K write command, which falls in the category of aligned commands. The driver 26 also places command C3 to the tail of the normal command queue 28 since it is a read command. Similarly to the above, the driver 26 enqueues command C4 to the tail of the unaligned command queue 29 and command C5 to the tail of the normal command queue 28. The illustrated queuing operation directs RMW-free commands to the normal command queue 28 and RMW-causing commands to the unaligned command queue 29. The description now returns to the flowchart of the command sorting routine.

(Step S14) The driver 26 examines unaligned commands stored in the unaligned command queue 29 to determine whether it is possible to produce an aligned command from any two or more of those unaligned commands. More specifically, the driver 26 seeks two or more unaligned commands whose write data areas, if combined, would make a continuous area between 4K-byte boundaries (i.e., would exactly fit within a 4K-byte physical sector).

Figure 8:
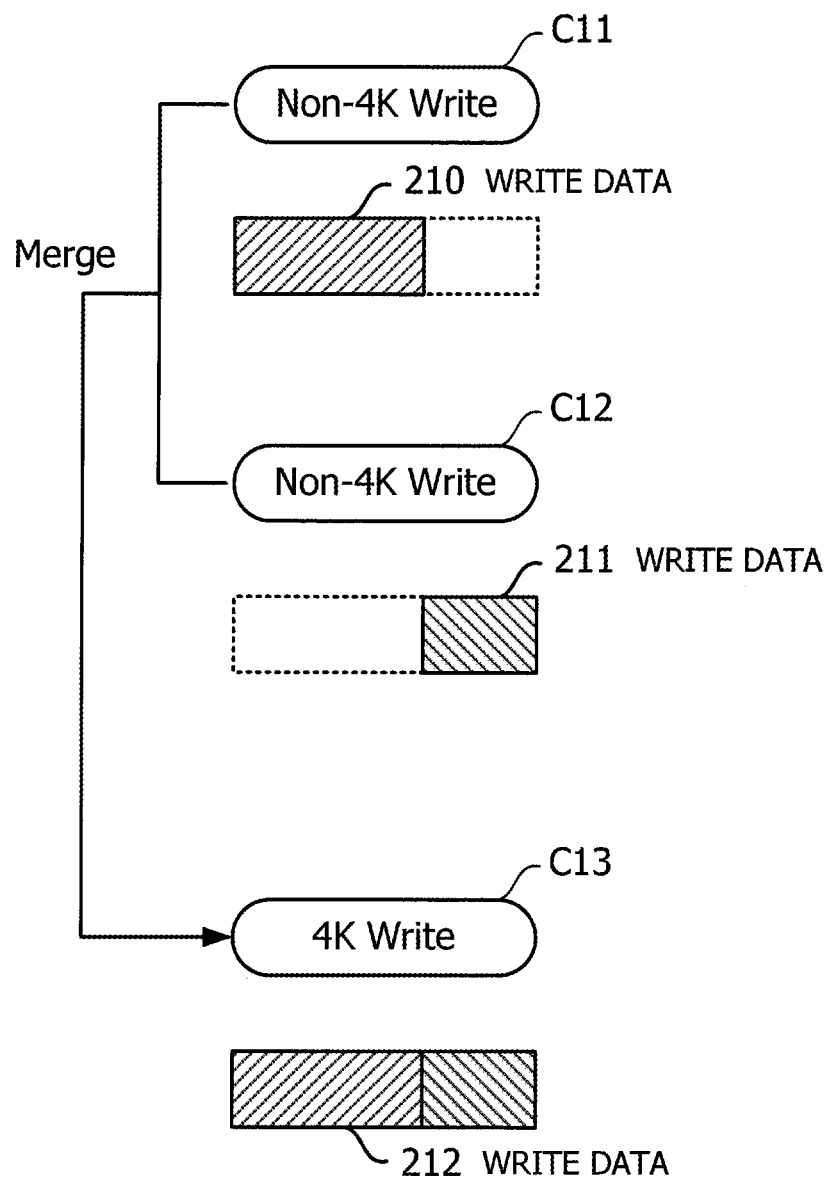
FIG. 8 gives an example of how the second embodiment produces an aligned command from unaligned commands.

FIG. 8 gives an example of how the second embodiment produces an aligned command from unaligned commands. That is, one unaligned command C11 is to store its write data 210, not in the whole of, but only in an anterior part of a specific 4K-byte sector. The other unaligned command C12 is to store its write data 211 in a posterior part of the same specific 4K-byte sector. That is, these two pieces of write data 210 and 211 are located in complementary sections of one 4K-byte sector and may thus be merged into a single piece of write data 212. The resulting write data 212 is 4K-aligned, the entirety of which can be written in a 4K-byte sector with a single aligned write command C13.

When no such complementary pieces of unaligned data are found in the unaligned command queue 29, the driver 26 is unable to produce an aligned command from the currently stored unaligned commands in the discussed way. The driver 26 may then wait for input of new unaligned commands suitable for conversion to an aligned command.

The description now returns to the flowchart of the command sorting routine.

(Step S15) The driver 26 advances to step S16 when the determination result of step S14 indicates the presence of unaligned commands that can be combined into an aligned command. Otherwise, the driver 26 proceeds to step S19.

(Step S16) The driver 26 dequeues the unaligned commands found at step S14 from the unaligned command queue 29 to turn them into an aligned command. It is noted that the driver 26 temporarily disables FIFO features of the unaligned command queue 29 during this dequeuing of unaligned commands.

(Step S17) The driver 26 produces an aligned command out of the unaligned commands dequeued from the unaligned command queue 29. In other words, the driver 26 converts these unaligned commands into an aligned command.

(Step S18) The driver 26 enqueues the produced aligned command to the head of the normal command queue 28 and then exits from the command sorting routine of FIG. 6. This new aligned command is supposed to be dequeued soon from the normal command queue 28 and issued to HDDs 31.

As can be seen from the above, the storage disk array device 20 has the capability of converting some of the unaligned commands into aligned commands, thereby reducing RMW cycles in I/O operations of HDDs 31. The reduction in the number of RMW cycles contributes to avoiding performance degradation in HDD access. It is also noted that the noted conversion of unaligned commands also means a reduction in the total number of commands to be executed. This feature of the proposed storage disk array device 20 is expected to enhance the performance of HDD access.

(Step S19) The driver 26 checks the cache usage by the unaligned command queue 29. For example, the driver 26 determines whether the cache usage in question is greater than a predetermined threshold. When the comparison with the threshold indicates that the unaligned command queue 29 has a high cache usage, the process advances to step S20. Otherwise, the driver 26 exits from the command sorting routine.

The threshold may be varied according to the operational status of the storage disk array device 20 or the usage of memory 23. The purpose of the cache usage determination is to prevent the unaligned command queue 29 from swelling too much with pending unaligned commands. To achieve the same purpose, the driver 26 may be configured to check, instead, the amount of unaligned commands accumulated in the unaligned command queue 29 or the length of time (e.g., average duration) the commands stay in the unaligned command queue 29.

(Step S20) Now that the unaligned command queue is found to have a high cache usage, the driver 26 calls a command discharging routine. Briefly, this routine is called to determine whether to output unaligned commands as RMW-causing commands or as RMW-free commands accompanying a pseudo read command (described later). Details of the command discharging routine will be described later with reference to FIG. 11.

Figure 9:
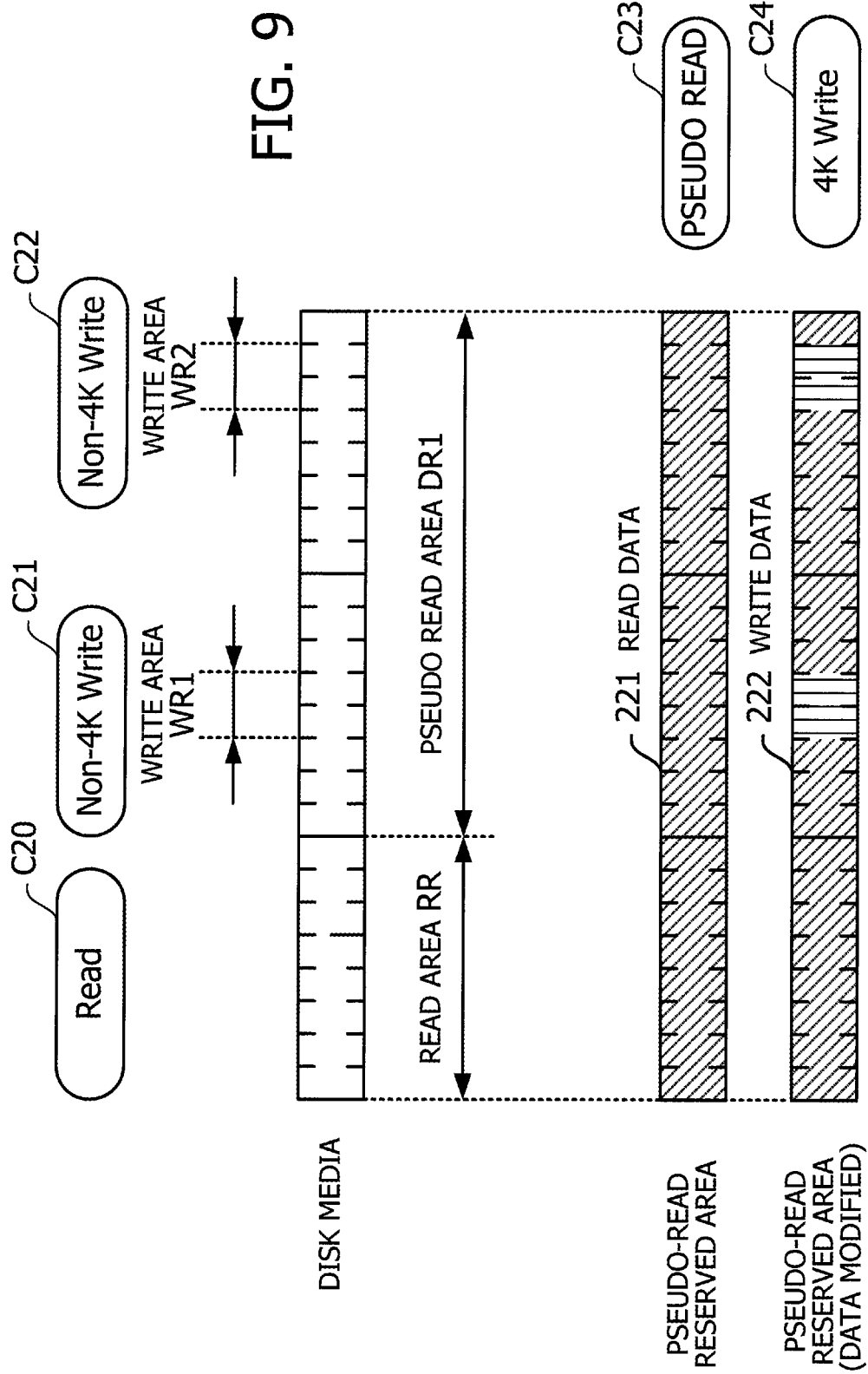
FIG. 9 exemplifies a pseudo read command and its operation in the second embodiment.
Figure 10:
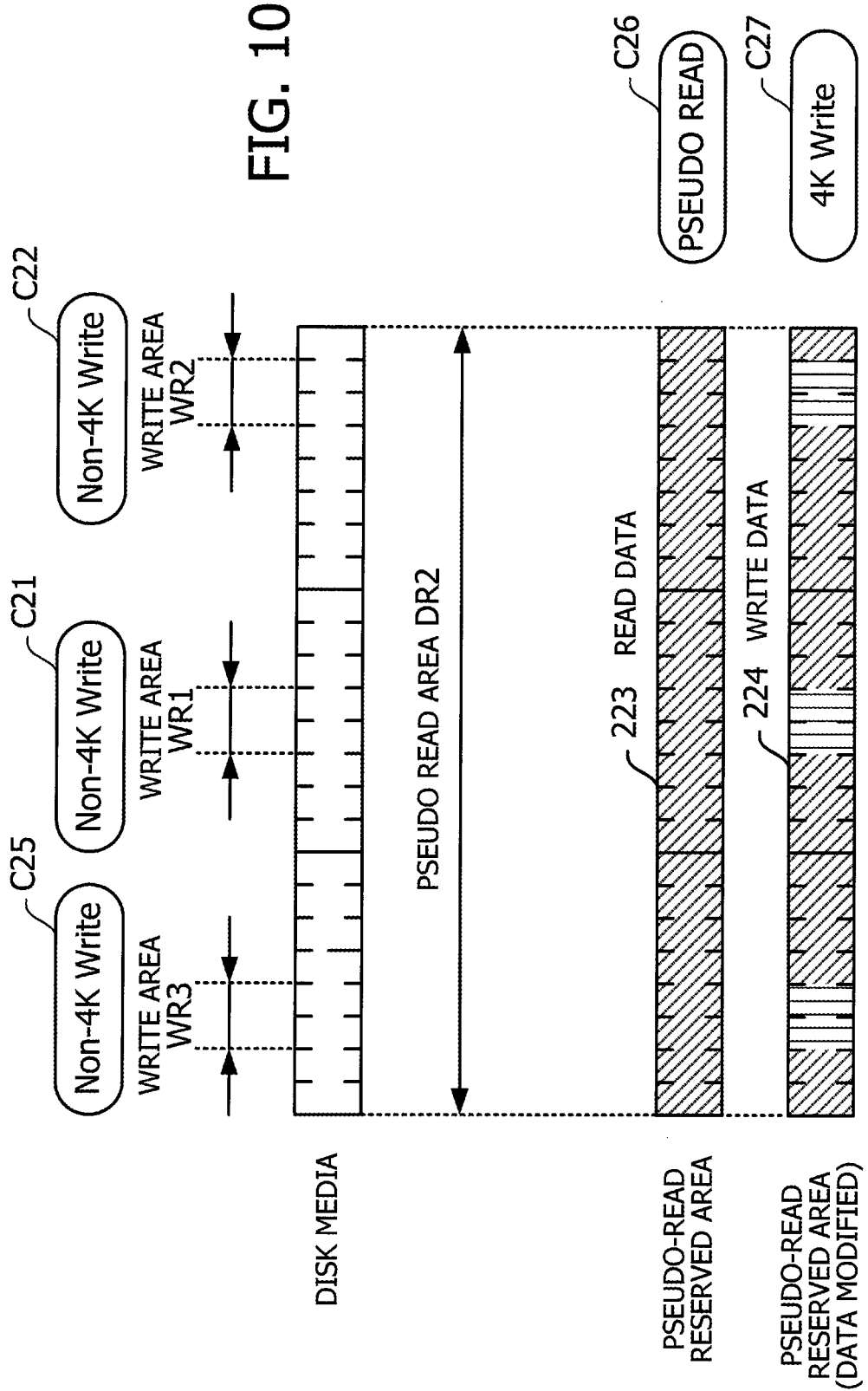
FIG. 10 illustrates another pseudo read command and its operation in the second embodiment, where the command's pseudo read area overlaps with write areas of three unaligned commands.

Before proceeding to the next step S21, the description explains pseudo read commands with reference to FIGS. 9 and 10. One type of pseudo read commands are used to expand the data range of received read commands. For example, FIG. 9 illustrates a pseudo read command and its operation in the second embodiment. Here the driver 26 has previously reserved an area of the cache memory (part of the memory 23) for the purpose of handling pseudo read commands, the area being referred to herein as a "pseudo-read reserved area." When there is a read command for a specific physical sector, the driver 26 may turn it into a pseudo read command that reads out data, not only in the physical sector specified by the original read command, but also in one or more additional physical sectors that follow. In other words, this pseudo read command is to read data from HDDs 31 while expanding its original data range of the received read command by the length of a pseudo read area. Note here that the pseudo read area, when combined with the original read area, is smaller than or equal in size to the pseudo-read reserved area mentioned above.

The driver 26 produces such a pseudo read command when the read area of a received read command, if expanded in the way described above, is expected to overlap with the write data area of an unaligned command in the unaligned command queue 29. The example seen in FIG. 9 assumes that the unaligned command queue 29 contains, among others, two unaligned commands C21 and C22 for writing data in their respective write areas WR1 and WR2. The driver 26 then receives a read command C20 that requests data in a read area RR. This event gives the driver 26 the chance of eliminating RMW cycles of the unaligned commands C21 and C22 by expanding the read area RR to create a pseudo read area DR1 that contains the write areas of these commands C21 and C22.

The driver 26 thus issues a pseudo read command (or expanded read command) C23 instead of enqueuing the received read command C20 as is, so that expanded read data 221 will be cached in the pseudo-read reserved area. The driver 26 now modifies the read data 221 (hatched with oblique lines) by replacing relevant part with the specified write data (hatched with horizontal lines) of the two unaligned commands C21 and C22. FIG. 9 illustrates write data 222 produced in this way. The driver 26 subsequently issues an aligned write command C24 for the write data 222. As can be seen from this example, the driver 26 is capable of issuing an RMW-free aligned command C24 in place of RMW-causing unaligned commands C21 and C22.

Another type of pseudo read commands may be produced from unaligned commands when a pseudo read area can be created to cover their write areas. For example, FIG. 10 illustrates another pseudo read command and its operation in the second embodiment, where the command's pseudo read area overlaps with write areas of three unaligned commands.

The driver 26 produces a pseudo read command whose pseudo read area overlaps with write data areas of a plurality of unaligned commands, when it is allowed to issue pseudo read commands. Referring to the example of FIG. 10, the unaligned command queue 29 contains, among others, three unaligned commands C21, C22, and C25 for writing data in their respective write areas WR1, WR2, and WR3. The driver 26 produces a pseudo read command C26, provided that issuance of pseudo read commands has been enabled. This pseudo read command C26 is to read data out of a pseudo read area DR2 extending from the read area of the unaligned command C25 which would be read in its RMW cycle. The pseudo read command C26 is to read data from its pseudo read area DR2 containing all the three write areas WR1, WR2, and WR3, making it possible to obviate the need for RMW in the individual unaligned commands C21, C22, and C25.

The driver 26 issues such a pseudo read command C26 in the illustrated situation, thereby loading the pseudo-read reserved area with read data 223. The driver 26 then modifies this read data 223 (hatched with oblique lines) with write data (hatched with horizontal lines) of each unaligned command C21, C21, and C25. FIG. 10 illustrates write data 224 produced in this way. The driver 26 subsequently issues an aligned write command C27 for the write data 224. As can be seen from this example, the driver 26 is capable of issuing an RMW-free aligned command C27 in place of RMW-causing unaligned commands C21, C22, and C25.

The description now returns to the flowchart of the command sorting routine.

(Step S21) The driver 26 checks the result of the above command discharging routine of step S20. When it is found that a pseudo read command has been produced at step S20, the driver 26 advances to step S22. Otherwise, the driver 26 proceeds to step S23. Note that the command discharging routine is configured to produce a pseudo read command whose pseudo read area overlaps with write areas of multiple unaligned commands as in the example of FIG. 10. Pseudo read commands that expand a read command are not within the scope of the command discharging routine.

(Step S22) The driver 26 enqueues the produced pseudo read command to the head of the normal command queue 28 and then exits from the command sorting routine of FIG. 6. This pseudo read command is supposed to be dequeued soon from the normal command queue 28 and issued to HDDs 31.

(Step S23) The driver 26 dequeues an unaligned command from the unaligned command queue 29.

(Step S24) The driver 26 enqueues the dequeued unaligned command to the head of the normal command queue 28 and then exits from the command sorting routine of FIG. 6. This unaligned command is supposed to be dequeued soon from the normal command queue 28 and issued to HDDs 31.

Figure 11:
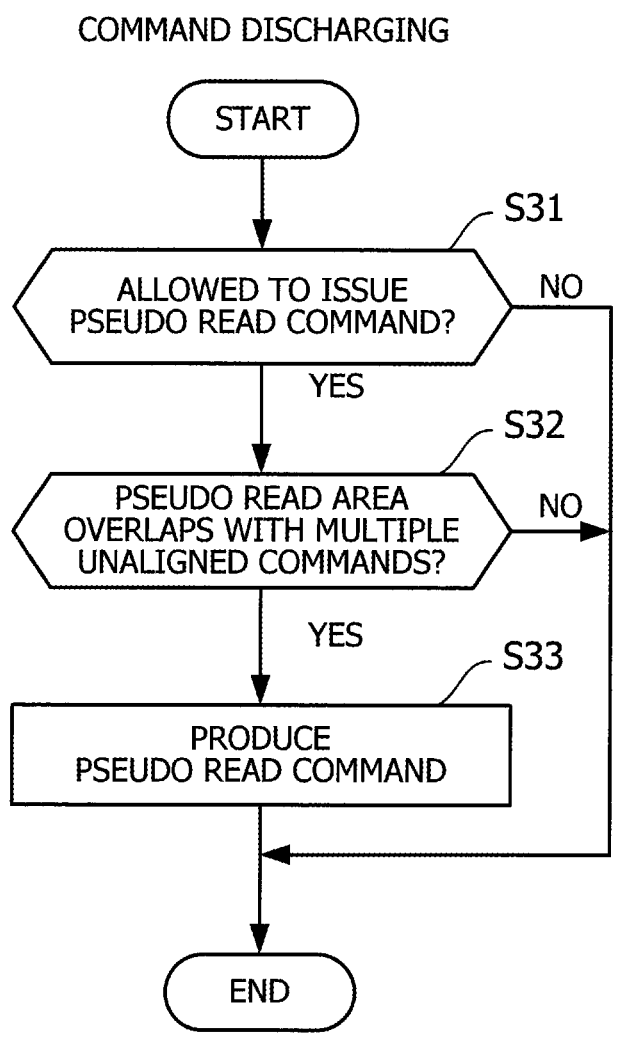
FIG. 11 is a flowchart of a command discharging routine according to the second embodiment.

Referring next to FIG. 11, the following description will explain how the second embodiment discharges commands from the unaligned command queue 29. FIG. 11 is a flowchart of a command discharging routine according to the second embodiment. The command discharging routine is called and executed by the driver 26 at step S20 of the foregoing command sorting routine to discharge unaligned commands.

(Step S31) The driver 26 (processor 22) determines whether it is enabled to issue pseudo read commands. This determination is made on the basis of a setup parameter previously defined by a pseudo read setup routine described later with reference to FIG. 14. The driver 26 advances to step S32 when the setup parameter indicates that issuance of pseudo read commands is enabled. Otherwise, the driver 26 exits from the command discharging routine.

(Step S32) The driver 26 determines whether there is a pseudo read area that overlaps with write areas of a plurality of unaligned commands. When such a pseudo read area is found, the driver 26 advances to step S33. Otherwise, the driver 26 exits from the command discharging routine.

(Step S33) The driver 26 produces a pseudo read command for reading data from the found pseudo read area and exits from the command discharging routine.

Figure 12:
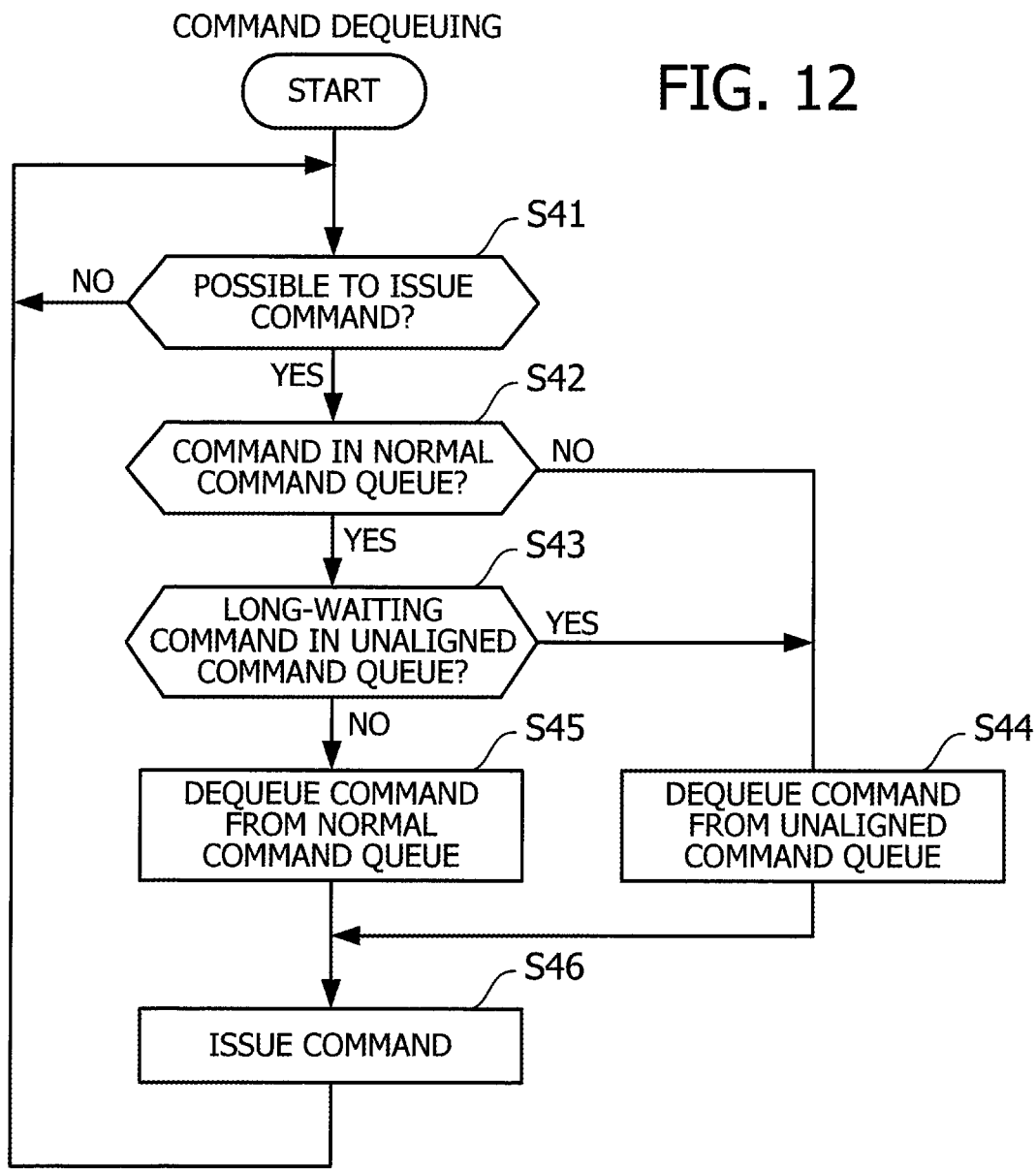
FIG. 12 is a flowchart illustrating a dequeuing routine according to the second embodiment.

Referring next to FIG. 12, the following description will explain how the second embodiment dequeues pending commands. FIG. 12 is a flowchart illustrating a dequeuing routine according to the second embodiment. This dequeuing routine, executed by the driver 26 while it is active, dequeues commands from the I/O wait queue 27 and issues them to HDDs 31.

(Step S41) The driver 26 (processor 22) determines whether it is possible to issue commands. For example, the driver 26 determines whether the destination of commands is ready to receive commands. When it is possible to issue commands, the driver 26 advances to step S42. Otherwise, the driver 26 repeats this step S41, thus waiting until it becomes possible to issue commands.

(Step S42) The driver 26 determines whether the normal command queue 28 contains a pending command. When a command is found in the normal command queue 28, the driver 26 advances to step S43. Otherwise, the driver 26 proceeds to step S44.

(Step S43) The driver 26 determines whether the unaligned command queue 29 contains any command that has been waiting for a long time. An appropriate threshold has previously been defined for comparison of this waiting time, either as a fixed value or as a variable value that may vary depending on the operational status of the driver 26. When such a long-waiting command is found in the unaligned command queue 29, the driver 26 advances to step S44. Otherwise, the driver 26 proceeds to step S45.

(Step S44) The driver 26 dequeues an unaligned command from the unaligned command queue 29.

(Step S45) The driver 26 dequeues an aligned command from the normal command queue 28.

(Step S46) Now that a command has been dequeued from the I/O wait queue 27 (normal command queue 28 or unaligned command queue 29), the driver 26 issues the dequeued command to HDDs 31 and returns to step S41 to wait the opportunity to issue another command.

As can be seen from the above flowchart, the driver 26 discharges commands from the normal command queue 28 in preference to the unaligned command queue 29. The driver 26, however, prevents unaligned commands from staying too long in the unaligned command queue 29.

Figure 13:
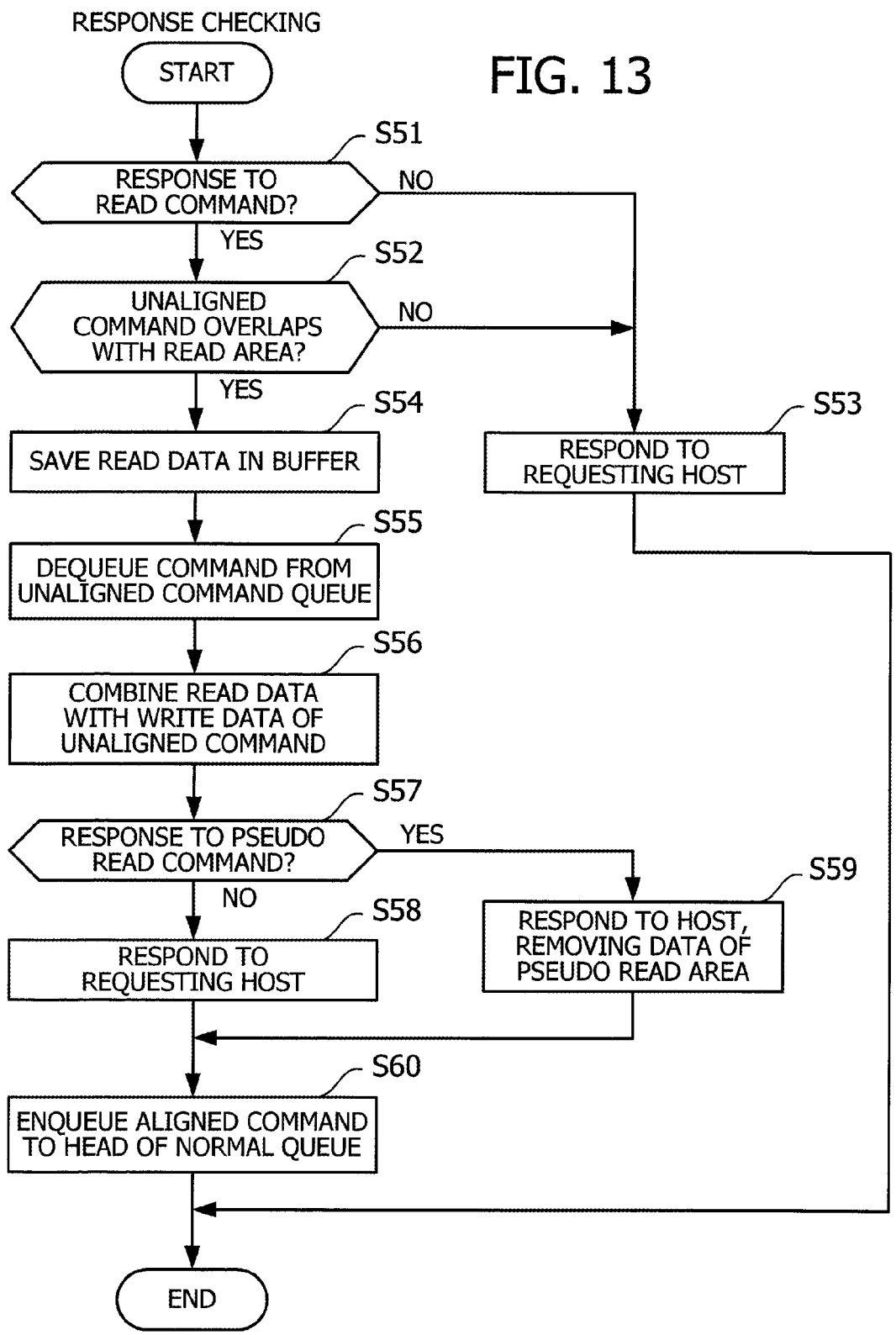
FIG. 13 is a flowchart illustrating a response checking routine according to the second embodiment.

Referring next to FIG. 13, the following description will explain how the second embodiment handles responses to the commands that are issued. FIG. 13 is a flowchart illustrating a response checking routine according to the second embodiment. This routine is executed by the driver 26 to check a response received from the destination of a command.

(Step S51) Upon receipt of a response from the destination of a command, the driver 26 (processor 22) determines whether the received response is for a read command. When the response is found to be for a read command, the driver 26 advances to step S52. Otherwise, the driver proceeds to step S53. Note that what are referred to herein as "read commands" include pseudo read commands.

(Step S52) The driver 26 determines whether the unaligned command queue 29 contains any unaligned commands whose write areas overlap with the read area of the read command found above. When such an unaligned command or commands are found, the driver 26 advances to step S54. Otherwise, the driver 26 proceeds to step S53.

(Step S53) The driver 26 returns a response to the requesting host device (i.e., the source of the read command) and exits from the response check routine.

(Step S54) The driver 26 saves read data in a buffer (pseudo-read reserved area).

(Step S55) The driver 26 dequeues the unaligned command or commands found at step S52 from its or their locations in the unaligned command queue 29. Note that this dequeuing does not necessarily take place at the head of the unaligned command queue 29.

(Step S56) The driver 26 modifies the read data saved in the buffer with the write data of each dequeued command. The driver 26 handles the dequeued unaligned command(s) in this way, eliminating the need for reading data for their RMW cycles, and making it possible to convert these unaligned commands into an aligned command. The write data of this new command contains all write data of the original unaligned commands.

(Step S57) The driver 26 determines whether the received response is for a pseudo read command. When it is, the driver 26 advances to step S59. Otherwise, the driver 26 proceeds to step S58.

(Step S58) The driver 26 returns a response to the requesting host device (the source of the read command).

(Step S59) The driver 26 returns a response to the requesting host device, removing data (and any other things in the received response) corresponding to its pseudo read area. For example, the pseudo read command in question may have been issued as an expanded read command as in the case of the pseudo read command C23 discussed in FIG. 9. The received response in this case is made up of two parts, one corresponding to the original read RR and the other corresponding to the pseudo read area DR1. The driver 26 then returns a response to the requesting host device, removing the latter part of the received response. The pseudo read command in question may otherwise have been issued for a pseudo read area covering write areas of multiple unaligned commands as in the case of the pseudo read command C26 discussed in FIG. 10. When this is the case, the driver 26 outputs nothing at step S59, as opposed to the caption seen in FIG. 13, since the received response is not for host commands.

(Step S60) The driver 26 enqueues the dequeued unaligned command to the head of the normal command queue 28 and then exits from the response check routine of FIG. 13.

As can be seen from the above flowchart, the driver 26 seeks unaligned commands related to a read command (including pseudo read command) to which a response has been returned. The driver 26 converts these unaligned commands into an aligned command to eliminate their RMW cycles. This feature of the driver 26 reduces the frequency of RMW cycles in HDDs 31, which would otherwise be performed as part of execution of unaligned commands. The driver 26 thus prevents the HDDs 31 from degradation of its performance.

Figure 14:
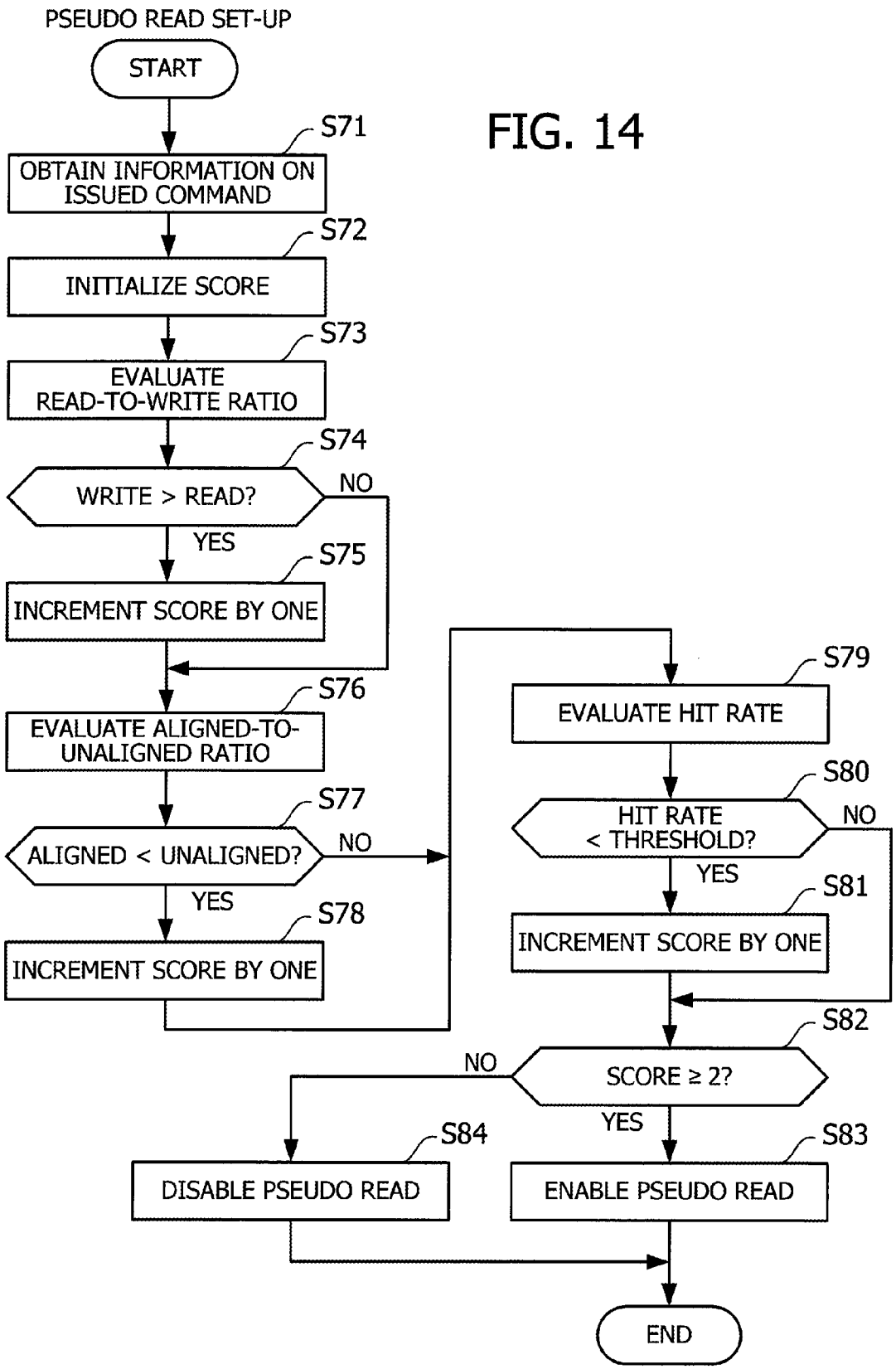
FIG. 14 is a flowchart illustrating a pseudo read setup routine according to the second embodiment.

Referring lastly to FIG. 14, the following description will explain how the second embodiment manages a setup parameter for pseudo read commands. FIG. is a flowchart illustrating a pseudo read setup routine according to the second embodiment.

The pseudo read setup routine determines whether to enable or disable issuance of pseudo read commands and indicates it in a setup parameter. The driver 26 executes this routine on some specific conditions (e.g., at predetermined timer intervals or upon detection of particular events) to update the setup parameter for pseudo read commands.

(Step S71) The driver 26 (processor 22) obtains information about commands that the driver 26 have issued to HDDs 31. What is being referred to here is the information that the driver 26 uses to evaluate how smoothly the commands are being discharged from the unaligned command queue 29. For example, this information may be the ratio of read commands to write commands (read-to-write ratio), the ratio of aligned commands to unaligned commands (aligned-to-unaligned ratio), the rate at which unaligned commands are turned into aligned commands (hit rate), or any combinations of them. The storage disk array device 20 may include a data collection unit (not illustrated) to collect such records of issued commands and compile them as statistical data.

(Step S72) The driver 26 initializes an evaluation score (e.g., clears it to zero). This evaluation score will be used to determine whether to enable or disable issuance of pseudo read commands. For example, the issuance of pseudo read commands is enabled when the evaluation score is greater than a predetermined threshold.

(Step S73) The driver 26 evaluates the read-to-write ratio, which suggests how much part of the read commands addressed to particular disks of interest may be utilized to read data for RMW of unaligned commands. For example, if read commands outnumber write commands, then it means that the unaligned command queue 29 has been discharging a relatively large number of commands in the response checking routine. If read commands are fewer than write commands, then it means that the unaligned command queue 29 has been discharging a relatively small number of commands in the response checking routine.

(Step S74) When write commands outnumber read commands, the driver 26 advances to step S75. Otherwise, the driver 26 skips to step S76.

(Step S75) The driver 26 determines that the unaligned command queue 29 has been discharging a relatively small number of commands, thus incrementing the evaluation score by one.

(Step S76) The driver 26 evaluates the aligned-to-unaligned ratio, which suggests how often the driver 26 issues unaligned commands to particular disks of interest, relative to aligned commands. If aligned commands outnumber unaligned commands, it means that a relatively small number of commands are accumulated in the unaligned command queue 29. If aligned commands are fewer than unaligned commands, it means that a relatively large number of commands are accumulated in the unaligned command queue 29.

(Step S77) When aligned commands are fewer than unaligned commands, the driver 26 advances to step S78. Otherwise, the driver 26 skips to step S79.

(Step S78) The driver 26 determines that a relatively large number of commands are accumulated in the unaligned command queue 29, thus incrementing the evaluation score by one.

(Step S79) The driver 26 evaluates the hit rate, which indicates how often the unaligned commands for the disks of interest have been turned into aligned commands. For example, a high hit rate means that the unaligned command queue 29 has been discharging a relatively large number of commands. A low hit rate means that the unaligned command queue 29 has been discharging a relatively small number of commands. As an alternative, the driver 26 may evaluate the frequency of unaligned commands being issued, or the frequency of RMW cycles being executed. These alternative factors actually represent a miss rate, as opposed to the hit rate used above. It is also noted that steps S73, S76, and S79 may be implemented to compare the read-to-write ratio, aligned-to-unaligned ratio, and hit rate with their respective thresholds, which may be previously determined or dynamically updated depending on the operational status of the storage system.

(Step S80) When the hit rate is smaller than a threshold, the driver 26 advances to step S81. Otherwise, the driver 26 skips to step S82.

(Step S81) The driver 26 determines that the unaligned command queue 29 has been discharging a relatively small number of commands, thus incrementing the evaluation score by one.

(Step S82) The driver 26 compares the evaluation score with a predetermined thresholds (e.g., two). When the evaluation score is two or greater, the driver 26 advances to step S83. Otherwise, the driver 26 proceeds to step S84.

(Step S83) The driver 26 enables issuance of pseudo read commands and exits from the pseudo-read setup routine, with a setup parameter indicating the result.

(Step S84) The driver 26 disables issuance of pseudo read commands and exits from the pseudo-read setup routine, with a setup parameter indicating the result.

The above-described steps cause the driver 26 to evaluate the queuing status (i.e., how smoothly the commands are being discharged from the unaligned command queue 29) from the read-to-write ratio, aligned-to-unaligned ratio, and hit rate, and determine whether to enable or disable issuance of pseudo read commands based on the evaluation.

The setup parameter of pseudo read commands is referenced at step S31 in the foregoing command discharging routine, which permits the driver 26 to adjust the discharge rate of the unaligned command queue to prevent unaligned commands from building up too much in the unaligned command queue 29. In other words, the unaligned command queue 29 is controlled so that an appropriate number of unaligned commands queue up. This feature of the second embodiment reduces the occurrence of RMW cycles for unaligned commands.

As can be seen from the above, the proposed storage disk array device 20 is designed to avoid performance degradation in HDD access by reducing RMW cycles. This is achieved by the driver 26 of the second embodiment, which takes several chances of dequeuing unaligned commands from the unaligned command queue 29 as will be summarized below.

Condition #1: An unaligned write command is dequeued from the unaligned command queue 29 upon receipt of a response to a read command if the read command's data area contains the write area of that unaligned write command. This is what the driver 26 performs at step S55 of the foregoing response check routine.

Condition #2: Two or more unaligned commands are dequeued from the unaligned command queue 29 when their write data areas, as a whole, would make a continuous area between 4K-byte boundaries (and there is thus no need to read data). This is what is performed at step S16 of the foregoing command distribution routine.

Condition #3: An unaligned command is dequeued from the unaligned command queue 29 when the cache usage of unaligned commands is increased. This is what the driver 26 performs at step S23 of the foregoing command distribution routine.

Condition #4: An unaligned command is dequeued from the unaligned command queue 29 when the normal command queue 28 is empty. This is what the driver 26 performs at step S44 immediately after step S42 in the foregoing dequeuing routine.

Condition #5: An unaligned command is dequeued from the unaligned command queue 29 when that command stays there for an excessive amount of time. This is what the driver 26 performs at step S44 after steps S43 in the foregoing dequeuing routine.

The above-described second embodiment uses two separate queues, namely, normal command queue 28 and unaligned command queue 29, so that the driver 26 directs each received command to either of them. As an alternative, the second embodiment may be modified to enter received commands to a unified I/O wait queue 27. This single-queue configuration may be applied when aligned commands are distinguished from unaligned commands in the same queue line. That is, the driver 26 distinguishably marks each received command, instead of distributing them to separate queues.

The above-described processing functions of the storage control apparatus 1 and storage disk array device (CMs 21) may be implemented on a computer system, the instructions being encoded and provided in the form of computer programs. A computer system executes those programs to provide the processing functions discussed in the preceding sections. The programs may be recorded in a computer-readable medium for the purpose of storage and distribution. Such computer-readable media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW, and others. Magneto-optical storage media include magneto-optical discs (MO), for example.

Portable storage media, such as DVD and CD-ROM, are used for distribution of program products. Network-based distribution of software programs may also be possible, in which case program files are made available on a server computer for transfer to other computers via a network.

For example, a computer stores software programs in its local storage device, which have previously been installed from a portable storage medium or downloaded from a server computer. The computer executes these programs read out of the local storage device, thereby performing their programmed functions. Where appropriate, the computer may execute program codes read out of a portable storage medium, without installing them in its local storage device. Another alternative method is that the computer dynamically downloads programs from a server computer when they are demanded and executes them upon delivery from the server.

It is further noted that the above processing functions may be executed wholly or partly by a DSP, ASIC, PLD, or other electronic circuits.

A couple of embodiments of a storage control apparatus, program, and method have been discussed above. In one aspect of those embodiments, the proposed techniques reduce the frequency of RMW cycles in storage devices and thus alleviate performance degradation in disk access.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus that controls input and output operations on a storage device in response to received commands, the received commands specifying data with a first data step size, the storage device being configured to store data with a second data step size that is an integer multiple of the first data step size, the storage control apparatus comprising:
 a memory configured to store commands; and
 a controller configured to perform a procedure including:
  storing the received commands in the memory, while sorting the received commands into first commands and second commands, the first commands being write commands whose data boundaries do not match with the second data step size, the second commands including read commands and write commands whose data boundaries match with the second data step size,
  receiving a read command from a host device and issuing the received read command to the storage device,
  receiving a response to the read command issued to the storage device,
  combining read data contained in the received response to the issued read command and write data of one or more first commands in the memory into a new piece of write data, and
  issuing a new write command specifying the new piece of write data.

2. The storage control apparatus according to claim 1, wherein the procedure further includes:
 converting at least two first commands in the memory into a second command by combining the at least two first commands when a predetermined condition is met, and
 issuing the second commands to the storage device, in preference to the first commands;
  the memory includes a first queue and a second queue;
  the storing the received commands includes storing the second commands to the first queue, and the first commands to the second queue; and
  the converting includes dequeuing the at least two first commands from the second queue when the predetermined condition is met and producing a second command from the dequeued first commands.

3. The storage control apparatus according to claim 2, wherein the procedure performed by the controller further includes enqueuing the produced second command to a head position of the first queue.

4. The storage control apparatus according to claim 2, wherein the converting includes producing a single write command, as a second command, from the at least two first commands in the memory when write areas of the at least two first commands are both located within a single physical sector.

5. The storage control apparatus according to claim 4, wherein the controller performs the producing of a single write command when the at least two first commands overwrite entire data stored in the single physical sector.

6. The storage control apparatus according to claim 2, wherein the procedure performed by the controller further includes:

finding in the memory two or more first commands whose write areas fall within a limited area in the storage device, and producing a pseudo read command specifying a read area that contains the limited area.

7. A storage control apparatus that controls input and output operations on a storage device in response to received commands, the received commands specifying data with a first data step size, the storage device being configured to store data with a second data step size that is an integer multiple of the first data step size, the storage control apparatus comprising:

a memory configured to store commands; and a controller configured to perform a procedure including:

storing the received commands in the memory, while sorting the received commands into first commands and second commands, the first commands being write commands whose data boundaries do not match with the second data step size, the second commands including write commands whose data boundaries match with the second data step size, converting one or more first commands in the memory into a second command when a predetermined condition is met, and issuing the second commands to the storage device, in preference to the first commands, wherein:

the memory includes a first queue and a second queue;

the storing the received commands includes storing the second commands to the first queue, and the first commands to the second queue;

the converting includes dequeuing the one or more first commands from the second queue when the predetermined condition is met and producing a second command from the dequeued first commands;

the second commands further include read commands; and the converting also includes producing an expanded read command from a read command specifying a read area that is adjacent to a pseudo read area containing write areas of the one or more first commands, the expanded read command specifying an expanded read area containing both the read area and the pseudo read area.

8. The storage control apparatus according to claim 7, wherein the procedure performed by the controller further includes:

evaluating queuing status of the first commands in the second queue; and determining whether to enable or disable the producing of an expanded read command, based on a result of the evaluating.

9. A storage control apparatus that controls input and output operations on a storage device in response to received commands, the received commands specifying data with a first data step size, the storage device being configured to store data with a second data step size that is an integer multiple of the first data step size, the storage control apparatus comprising:

a memory including a first queue and a second queue to store commands; and a controller configured to perform a procedure including:

storing the received commands in the memory, while sorting the received commands into first commands and second commands and enqueuing the second commands to the first queue and the first commands to the second queue, the first commands being write commands whose data boundaries do not match with the second data step size, the second commands including read commands and write commands whose data boundaries match with the second data step size, converting at least two first commands dequeued from the second queue in the memory into a second command by combining the dequeued first commands when a predetermined condition is met, issuing the second commands to the storage device, in preference to the first commands, finding in the memory two or more first commands whose write areas fall within a limited area in the storage device, producing a pseudo read command specifying a read area that contains the limited area, evaluating queuing status of the first commands in the second queue, and determining whether to enable or disable the producing of a pseudo read command, based on a result of the evaluating.

10. A non-transitory computer-readable storage medium storing a program for controlling input and output operations on a storage device in response to received commands, the received commands specifying data with a first data step size, the storage device being configured to store data with a second data step size that is an integer multiple of the first data step size, wherein the program causes a computer to perform a procedure comprising:

storing the received commands in a memory, while sorting the received commands into first commands and second commands, the first commands being write commands whose data boundaries do not match with the second data step size, the second commands including read commands and write commands whose data boundaries match with the second data step size;

receiving a read command from a host device and issuing the received read command to the storage device;

receiving a response to the read command issued to the storage device;

combining read data contained in the received response to the issued read command and write data of one or more first commands in the memory into a new piece of write data; and issuing a new write command specifying the new piece of write data.

11. A method of controlling input and output operations on a storage device in response to received commands, the received commands specifying data with a first data step size, the storage device being configured to store data with a second data step size that is an integer multiple of the first data step size, the method comprising:

storing, by a computer, the received commands in a memory, while sorting the received commands into first commands and second commands, the first commands being write commands whose data boundaries do not match with the second data step size, the second commands including read commands and write commands whose data boundaries match with the second data step size;

receiving, by the computer, a read command from a host device and issuing the received read command to the storage device;

receiving, by the computer, a response to the read command issued to the storage device;

combining, by the computer, read data contained in the received response to the issued read command and write data of one or more first commands in the memory into a new piece of write data; and issuing, by the computer, a new write command specifying the new piece of write data.

\* \* \* \* \*